3,024,234
4-PHENYL-4-ALKANOYL-PIPERIDINE DERIVATIVES

Edward Severin Stern, Edinburgh, Scotland, assignor to J. F. MacFarlan & Company Limited, Edinburgh, Scotland, a British company
No Drawing. Filed Feb. 3, 1959, Ser. No. 790,809
Claims priority, application Great Britain Feb. 12, 1958
6 Claims. (Cl. 260—247.5)

This invention relates to novel piperidine compounds and their production.

The present invention provides compounds of the general formula:

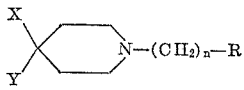

and salts thereof, where:

X is a phenyl group,
Y is an acyl residue (such as acetyl or propionyl),
R is an alkoxy group which is either unsubstituted or further substituted by oxygenated groups, an aryloxy or substituted aryloxy group or a heterocyclic residue containing an oxygen atom, and
n is an integer of from 1 to 6 inclusive.

The substances of the present invention have mild analgesic properties and depress the cough-reflex centre.

The present invention also includes a process for the preparation of the novel compounds of the present invention wherein a halide of the general formula R.(CH$_2$)$_n$Hal, where Hal is chlorine, bromine or iodine, and R and n have the meanings given above, is reacted with a secondary base of the general formula:

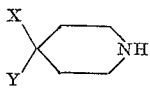

where X and Y have the meanings given above.

The present invention further includes a process for the preparation of the novel compounds of the present invention wherein a Grignard reagent, such as methylmagnesium iodide or ethylmagnesium iodide or an alkyl-lithium derivative is reacted with a nitrile of the general formula:

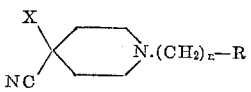

where X, n and R have the meanings given above.

It will be understood that the free bases may be converted into salts by treatment with acids.

The following examples, in which the parts are by weight, illustrate the invention.

*Example I.—1-2'-Phenoxyethyl-4-Phenylpiperidin-4-yl Ethyl Ketone and Its Hydrochloride and Hydrobromide*

1-benzyl-4-phenylpiperidin-4-yl ethyl ketone hydrochloride (50 parts), M.P. 245–247° C. (Eisleb, in German specification No. 713,746 gives M.P. 235–236° C.) was dissolved in methyl alcohol (250 parts); palladised carbon (2 parts) was added and the suspension shaken at 50° C. in an atmosphere of hydrogen until uptake of hydrogen was complete. Evaporation to dryness afforded 4-phenyl-piperidin-4-yl ethyl ketone hydrochloride, M.P. 206° C. The salt was dissolved in water, the solution made alkaline with aqueous ammonia, and the resulting suspension extracted with ether. Evaporation of the ether afforded 4-phenyl-piperidin-4-yl-ethyl ketone, B.P. 185–190° C./19 mm., 132° C./0.2 mm., $n_D^{20}$ 1.5480.

This base (10 parts) was dissolved in amyl alcohol (50 parts) and phenoxyethyl chloride (8 parts) and sodium carbonate (2 parts) were added; the suspension was kept at 140–150° C. for 48 hours, and then filtered. The amyl alcohol was removed under reduced pressure and the residue treated with 40% aqueous hydrobromic acid. 1-2'-phenoxyethyl-4-phenylpiperidin-4-yl ethyl ketone hydrobromide crystallised out, which on recrystallisation from aqueous ethanol had M.P. 185–186° C. This salt had useful antitussive properties, being about twice as potent as codeine.

*Example II.—1-2'-Tetrahydrofurfuryloxyethyl-4-Phenyl-Piperidin-4-yl Ethyl Ketone*

4-phenylpiperidin-4-yl ethyl ketone (30 parts) and 2-chloroethyl tetrahydrofurfuryl ether (23 parts) were mixed with amyl alcohol (100 parts) and sodium carbonate (5 parts). The mixture was boiled under reflux for 48 hours, and then filtered. Distillation of the filtrate afforded 1-2'-tetrahydrofurfuryloxyethyl-4-phenylpiperidin-4-yl ethyl ketone, B.P. 205–207° C./0.5 mm., $n_D^{20}$ 1.5290. The base in solution as the hydrochloride depressed the cough-reflex centre, being slightly more potent than codeine.

*Example III.—1-6'-Ethoxyhexyl-4-Phenylpiperidin-4-yl Ethyl Ketone*

4-phenylpiperidin-4-yl ethyl ketone (45 parts) and 6-ethoxyhexyl chloride (30 parts), B.P. 92° C./17 mm., $n_D^{20}$ 1.4380 were mixed with amyl alcohol (150 parts) and sodium carbonate (5 parts). The mixture was boiled under reflux for 48 hours and then filtered. Distillation of the filtrate afforded 1-6'-ethoxyhexyl-4-phenylpiperidin-4-yl ethyl ketone, B.P. 175° C./0.5 mm., $n_D^{20}$ 1.5199. This base was a potent cough suppressant when administered as the hydrochloride in aqueous solution.

*Example IV.—1-Tetrahydrofurfuryl-4-Phenyl-4-Propionyl-Piperidine*

4-phenylpiperidin-4-yl ethyl ketone (5 parts) and tetrahydrofurfuryl chloride (3 parts) were boiled in amyl alcohol (20 parts) over sodium carbonate (2 parts) for 48 hours. The suspension was filtered and the filtrate distilled. 1-tetrahydrofurfuryl-4-phenyl-4-propionylpiperidine was obtained with B.P. 170° C./0.5 mm., $n_D^{20}$ 1.5375. This base had codeine-like anti-tussive properties.

*Example V.—1-2'-Morpholinoethyl-4-Phenyl-4-Propionyl-Piperidine Dihydrochloride*

4-phenylpiperidin-4-yl ethyl ketone (5 parts) and morpholinoethyl chloride (3 parts) were kept in boiling amyl alcohol (25 parts) over sodium carbonate (2 parts) for 48 hours. The suspension was filtered, the amyl alcohol evaporated in vacuo, and the residue treated with an alcoholic solution of hydrogen chloride. 1-2'-morpholinoethyl-4-phenyl-4-propionylpiperidine dihydrochloride was precipitated which after recrystallisation from aqueous ethanol had M.P. 285° C. (decomp.). The salt administered in aqueous solution depressed the cough reflex centre.

*Example VI.—1-2'-2''-Hydroxyethoxyethyl-4-Phenyl-4-Propionyl-Piperidine*

4-phenylpiperidin-4-yl ethyl ketone (5 parts) and 2-chloroethyl 2-hydroxyethyl ether (3 parts) were kept in boiling amyl alcohol (20 parts) over sodium carbonate (2 parts) for 48 hours. The suspension was filtered and the filtrate distilled. 1-2'-2''-hydroxyethoxyethyl-4-phenyl-4-propionylpiperidine was obtained, boiling at 190° C./0.8 mm., and had $n_D^{20}$ 1.5332. This base had codeine-like properties.

Example VII.—1-2'-Phenoxyethyl-4-Phenylpiperidin-4-yl Ethyl Ketone Hydrobromide 4-cyano-4-phenylpiperidine (5 parts), a new substance of B.P. 125° C./0.2 mm. and $n_D^{20}$ 1.5522 (obtained from its hydrochloride of M.P. 207° C.) was boiled for 48 hours in amyl alcohol (20 parts) with phenoxyethyl chloride (3 parts) and sodium carbonate (2 parts). The suspension was filtered, the filtrate vacuum-evaporated to dryness, and the gummy residue treated with hydrobromic acid, when 1-phenoxyethyl-4-cyano-4-phenylpiperidine hydrobromide was precipitated; after recrystallisation from aqueous ethanol this salt had M.P. 160° C.

1-phenoxyethyl-4-cyano-4-phenylpiperidine hydrobromide (5 parts) was suspended in aqueous ammonia and ether was added; the organic phase was separated, dried and added to a solution of ethylmagnesium bromide in ether. The white suspension obtained was boiled in an atmosphere of nitrogen for 6 hours and then cooled and acidified with excess of hydrochloric acid. The organic phase was separated and discarded. The aqueous phase was rendered alkaline with excess of aqueous ammonia and exhausted with ether. The ether layer was dried and the solvent evaporated; the residue was treated with aqueous hydrobromic acid, when 1-2'-phenoxyethyl-4-phenylpiperidin-4-yl ethyl ketone hydrobromide crystallised. This salt was identical with that obtained by the process of Example 1.

Example VIII.—1-Ethoxyethyl-4-Acetyl-4-Phenylpiperidine 4-phenyl-4-cyanopiperidine (50 parts), prepared as described in Example VII, was boiled for 48 hours in amyl alcohol (200 parts) with ethoxyethyl chloride (40 parts) over sodium carbonate (25 parts). The suspension was then filtered and the filtrate distilled, giving the intermediate 1-ethoxyethyl-4-cyano-4-phenylpiperidine (45 parts), B.P. 125° C./0.15 mm., $n_D^{20}$ 1.5232.

This base (25 parts) in dry ether was added to a solution of methylmagnesium iodide (from 7 parts of magnesium) in ether and the white suspension was boiled in an atmosphere of nitrogen for 4 hours, then cooled, and acidified with dilute hydrochloric acid. The organic phase was discarded and the aqueous phase rendered alkaline and exhausted with ether. Distillation of the ethereal solution gave 1-ethoxyethyl-4-acetyl-4-phenylpiperidine, B.P. 140–145° C./0.15 mm., $n_D^{20}$ 1.5252.

Example IX.—1-2'-m-Methyl-Phenoxyethyl-4-Phenyl-Piperidin-4-yl-Ethyl Ketone Hydrobromide 4-phenylpiperidin-4-yl ethyl ketone (10 parts), prepared as described in Example I, dissolved in amyl alcohol (50 parts) containing sodium carbonate (2 parts) in suspension was treated with m-tolyloxyethyl chloride (9 parts). The mixture was refluxed for 48 hours and then filtered and the solvent was evaporated under reduced pressure. The residue was treated with 40% aqueous hydrobromic acid when 1-2'-m-methyl-phenoxyethyl-4-phenylpiperidin-4-yl ethyl ketone hydrobromide crystallised. After recrystallisation the melting point was 195° C.

This salt had an activity similar to the salt of Example I.

Example X.—1-2'-p-Methoxy-Phenoxyethyl-4-Phenylpiperidin-4-yl Ethyl Ketone Hydrobromide Example IX was repeated but using 10 parts of p-methoxy-phenoxyethyl chloride instead of 9 parts of m-tolyloxytheyl chloride. 1-2'-p-methoxy-phenoxyethyl-4-phenylpiperidin-4-yl ethyl ketone hydrobromide of melting point 193–195° C. was obtained. This salt had an activity similar to the salt of Example I.

Example XI.—1-2'-p-Chlorophenoxyethyl-4-Phenylpiperidin-4-yl Ethyl Ketone Hydrobromide Example IX was repeated but using 10 parts of p-chlorophenoxyethyl chloride instead of 9 parts of m-tolyloxyethyl chloride. 1-2'-p-chloro-phenoxyethyl-4-phenylpiperidin-4-yl ethyl ketone hydrobromide of melting point 201° C. was obtained. This salt had an activity similar to the salt of Example I.

Example XII.—1-Ethoxyethyl-4-Phenylpiperidin-4-yl Ethyl Ketone 4-phenylpiperidin-4-yl ethyl ketone (20 parts) prepared as described in Example I was condensed with ethoxyethyl chloride (10 parts) by adding the reactants to a suspension of sodium carbonate (4 parts) in amyl alcohol (70 parts) and the mixture was refluxed for 48 hours. After cooling and filtration, the reaction product was fractionated under reduced pressure, giving 1-ethoxy-4-phenylpiperidin-4-yl ethyl ketone, B.P. 160–165° C./0.5 mm. This acted as a cough sedative.

Example XIII.—1-Ethoxybutyl-4-Phenylpiperidin-4-yl Ethyl Ketone

Example XII was repeated but using 12 parts of ethoxybutyl chloride instead of 10 parts of ethoxyethyl chloride. 1-ethoxybutyl-4-phenylpiperidin-4-yl ethyl ketone of B.P. 165° C./0.3 mm. was obtained. This acted as a cough sedative.

Example XIV.—1-2'-2''-Ethoxyethoxyethyl-4-Phenyl-4-Propionylpiperidine 1-2'-2''-hydroxyethoxyethyl-4-phenyl-4-propionylpiperidine prepared as described in Example VI was etherified with diazoethane to give 1-2'-2''-ethoxyethoxyethyl-4-phenyl-4-propionylpiperidine, B.P. 175° C./0.5 mm., $n_D^{20}$ 1.5300, which had codeine-like properties.

Example XV.—1-2'-2''-Phenoxyethoxyethyl-4-Phenyl-4-Propionylpiperidine Hydrobromide 4-phenyl-4-propionylpiperidine (20 parts) and phenoxyethyl chloroethyl ether (20 parts) were dissolved in amyl alcohol (70 parts) with the addition of sodium carbonate (4 parts) and the mixture refluxed for 48 hours and then cooled. The cold suspension was filtered, the amyl alcohol evaporated in vacuo and the residue treated with 40% aqueous hydrobromic acid. 1-2'-2'''-phenoxyethoxyethyl-4-phenyl-4-propionylpiperidine crystallised out and on recrystallisation had a M.P. of 173° C. and possessed codeine-like properties.

What I claim is:

1. Compounds of the formula:

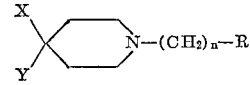

and non-toxic acid addition salts thereof, where X is phenyl, Y is selected from the group consisting of acetyl and propionyl, R is selected from the group consisting of ethoxy, hydroxyethoxy, phenoxy, p-anisoxy, p-chlorophenoxy, tetrahydrofurfuryloxy, tetrahydrofurfuryl and morpholino, and $n$ is an integer of from 1 to 6 inclusive.

2. 1-(2'-phenoxyethyl)-4-phenyl-4-propionylpiperidine.
3. 1-(2'-tetrahydrofurfuryloxyethyl)-4-phenyl-4-propionylpiperidine.
4. 1-(6'-ethoxyhexyl)-4-phenyl-4-propionylpiperidine.
5. 1-(2'-morpholinoethyl)-4-phenyl-4-propionylpiperidine.
6. 1-(2'-2'''-hydroxyethoxyethyl)-4-phenyl-4-propionylpiperidine.

References Cited in the file of this patent

UNITED STATES PATENTS

| | | |
|---|---|---|
| 2,192,894 | Carswell | Mar. 12, 1940 |
| 2,248,018 | Eisleb | July 1, 1941 |
| 2,355,659 | Nutley et al. | Aug. 15, 1944 |
| 2,546,159 | Kaegi et al. | Mar. 27, 1951 |
| 2,551,152 | Miescher et al. | May 1, 1951 |
| 2,898,340 | Janssen | Aug. 4, 1959 |